United States Patent [19]
Bederke et al.

[11] Patent Number: 5,852,120
[45] Date of Patent: Dec. 22, 1998

[54] AQUEOUS, HEAT CURABLE COATING COMPOUND, ITS PREPARATION AND ITS USE

[75] Inventors: Klaus Bederke, Sprockhövel; Volker Dücoffre, Wuppertal; Knut Gräf, Hattingen; Walter Schubert, Wuppertal, all of Germany

[73] Assignee: Herberts GmbH, Wuppertal, Germany

[21] Appl. No.: 946,894

[22] Filed: Oct. 8, 1997

Related U.S. Application Data

[63] Continuation of Ser. No. 692,828, Jul. 30, 1996, abandoned, which is a continuation of Ser. No. 379,122, Jan. 27, 1995, abandoned, which is a continuation of Ser. No. 91,313, Jul. 14, 1993, abandoned.

[30] Foreign Application Priority Data

Jul. 15, 1992 [DE] Germany .......................... 42 23 182.5
Jul. 15, 1992 [DE] Germany .......................... 42 23 183.3

[51] Int. Cl.$^6$ .............................. C08F 8/32; C08L 33/14
[52] U.S. Cl. .................. 525/124; 525/329.7; 525/329.9; 525/330.3; 525/375; 525/377; 525/380
[58] Field of Search ................... 525/124, 329.9, 525/329.7, 330.3, 375, 377

[56] References Cited

U.S. PATENT DOCUMENTS 4,909,915  3/1990  Bederke et al. ..................... 204/181.4
5,308,910  5/1994  Yuki et al. ............................... 524/503

*Primary Examiner*—Fred Zitomer
*Attorney, Agent, or Firm*—Schweitzer Cornman Gross & Bondell LLP

[57] ABSTRACT

Aqueous, heat-curable coating compound containing from 38.5 to 80% by weight of one or more film-forming copolymers and/or cocondensates which are emulsifiable in water or rendered water soluble by neutralisation with bases, having a number average molecular weight (Mn) of from 800 to 10,000, a hydroxyl number of from 60 to 390 and an acid number of from 15 to 60, B) from 0 to 25.5% by weight of one or more polyester oligomers having a calculated molecular weight of from 200 to 1000, a hydroxyl number of from 280 to 600 and an acid number of from 0 to 1.5, C) from 3.5 to 40% by weight of one or more amine resin cross-linking agents and D) from 0.5 to 28% by weight of one or more masked polyisocyanates, the percentages by weight of components A) to D) being based in each case on the solids contents by weight of the resins and adding up to 100% by weight, and water and optionally one or more organic solvents, pigments, fillers and/or the conventional auxiliary agents and additives used in lacquers.

17 Claims, No Drawings

5,852,120

AQUEOUS, HEAT CURABLE COATING COMPOUND, ITS PREPARATION AND ITS USE

This is a continuing application of U.S. Ser. No. 08/692, 828, filed Jul. 30, 1996; which is a continuation of U.S. Ser. No. 08/379,122, filed Jan. 27, 1995; which is a continuation of U.S. Ser. No. 08/091,313, filed Jul. 14, 1993, all now abandoned.

BACKGROUND OF THE INVENTION

This invention relates to an aqueous, heat curable coating compound based on film-forming copolymers and/or co-condensates in admixture with amine resin and masked poly-isocyanate optionally containing neutralising agents, conventional lacquer additives, pigments, fillers and/or organic solvents. The aqueous coating compound is suitable for the production of lacquerings, in particular as basic lacquer for multicoat lacquerings, preferably in the form of a clear lacquer.

The production of multicoat lacquerings is known, in particular in the construction of motor vehicles. For the production of these lacquerings, it is suitable to apply a clear lacquer coat "wet-in-wet" on a basic lacquer coat after a brief drying time and then to stove all the coats together.

Aqueous basic lacquers are described in the literature and used in practice. Coatings produced from such basic lacquers are, however, in practice as yet not provided with non-aqueous clear lacquer covering coats. Although a multilayered lacquering having a top coat of a clear lacquer which is said to be dilutable with water is described in DE-PS 28 06 497 no examples are given for such water dilutable clear lacquers. The basic lacquer compounds used are polyesters of high molecular weight and high viscosity which are dissolved in xylene and may be mixed with acrylate resins. Such lacquers require a large amount of neutralising agent and give rise to high solvent emission in use.

DE-OS 37 12 442 describes a mixture of a polyester/ melamine resin adduct with acrylic resins. This again requires large quantities of neutralising agent.

DE-OS 36 32 617 describes aqueous coating compositions based on highly viscous resins, for example polyester resins, in which resin particles, which may be acrylic resins, are dispersed. The compositions obtained are unstable and subject to rapid phase separation.

EP-A 02 06 072 describes film formers based on acrylic polymer products which have been prepared in a diluent having a molecular weight above 200 and which may be inter alia a polyester. These film formers are, however, not used in aqueous systems.

DE-A 39 10 829 describes an aqueous coating compound containing a polyester oligomer polyacrylate which is soluble in water after neutralisation with bases and an amine resin cross-linking agent. This system gives rise to high gloss, very hard clear lacquers DE-OS 35 37 855 describes the use of acid polycondensates based on acrylic resins and polyether polyols; after their neutralisation, these polycondensates may be used as water dilutable binders for the production of water dilutable stoving fillers, covering lacquers or clear lacquers.

The polyether polyols used in this case do not lose their highly hydrophilic character even after they have been stoved, with the result that these systems are insufficiently resistant to moist surroundings and sulphuric acid. The use of acid polyacrylates suitable for the preparation of water dilutable coating lacquers after they have been neutralised and diluted is also described in EP-A-0 365 775. In this case, the melamine resin used as cross-linking agent is not directly incorporated by emulsification but added separately. Hydrophobic melamine resins therefore cannot be used. The additional use of oligomers is not mentioned, nor is the cross-linking with masked polyisocyanates. Moreover, these coating compounds have unsatisfactory high solid values (HS values), i.e. they require a high proportion of organic solvents, of the order of 27 g or more, based on 100 g of resin solids content (corresponding to an HS value of 73 or less).

SUMMARY OF THE PRESENT INVENTION

It is an object of the present invention to provide aqueous coating compounds which give rise to coatings with high chemical resistance, in particular high resistance to acids such as sulphuric acid and oil black. In particular, the coating compounds should be suitable for use as clear lacquers.

It has been found in the context of this invention that this problem may be solved by preparing aqueous coating compounds which contain a combination of amine resins and polyisocyanates as cross-linking agents in addition to film forming resins.

The invention therefore relates to aqueous coating compounds containing

A) from 38.5 to 80% by weight of one or more film forming copolymers and/or cocondensates which are emulsifiable in water or rendered soluble in water by neutralisation with bases and have a number average molecular weight (Mn) of from 800 to 10,000, a hydroxyl number of from 60 to 390 and an acid number of from 15 to 60, B) from 0 to 25.5% by weight of one or more polyester oligomers having a calculated molecular weight of from 200 to 1000, a hydroxyl number of from 280 to 600 and an acid number of from 0 to 1.5, C) from 3.5 to 40% by weight of one or more amine resin cross-linking agents and D) from 0.5 to 28% by weight of one or more masked polyisocyanates, the percentages by weight of components A) to D), based on the solids contents of the resins by weight, adding up to 100% by weight, and water and optionally one or more organic solvents, pigments, fillers and/or conventional auxiliary agents and additives for lacquers.

DETAILED DESCRIPTION OF THE INVENTION

In a preferred embodiment, component A) of the coating compounds according to the invention comprises one or more self-emulsifiable copolymers based on esters of unsaturated carboxylic acids having hydrophobic and hydrophilic components, partly or completely neutralised with bases, a) the hydrophobic components being based on monomeric esters of unsaturated carboxylic acids having secondary OH groups optionally mixed with comonomers which are free from OH groups, and b) the hydrophilic components being based on monomeric esters of unsaturated carboxylic acids having primary OH groups and monomeric esters of unsaturated carboxylic acids containing COOH groups optionally present as mixtures with comonomers which are free from OH groups, the numerical ratio of primary to secondary OH groups in the copolymer being from 1:1.5 to 1:2.5 and the copolymer having an acid number of from 15 to 60 mg KOH/g, an OH number of from 60 to 200 mg KOH/g and a number average molecular weight (Mn) of from 2000 to 10,000.

In another preferred embodiment of the invention, the aqueous coating compounds contain A) from 38.5 to 80% by weight, preferably from 45 to 70% by weight, of one or more of the above-described self emulsifiable polymers based on esters of unsaturated carboxylic acids containing hydrophobic and hydrophilic components in addition to B) from 3.5 to 25.5% by weight, preferably from 5 to 15% by weight, of one or more polyester oligomers having a calculated molecular weight of from 200 to 1000, a hydroxyl number of from 280 to 600 and an acid number of from 0 to 1.5, C1) from 3.5 to 28% by weight, preferably from 10 to 20% by weight, of one or more water insoluble amine resin cross-linking agents, C2) from 0 to 4% by weight of one or more water-soluble amine resin cross-linking agents and D) from 0.5 to 28% by weight, preferably from 10 to 25% by weight, of one or more masked polyisocyanates, the percentages by weight of components A) to D), based on the solids contents of the resins by weight, adding up to 100% by weight, and water and optionally one or more organic solvents, pigments, fillers and/or auxiliary agents and additives conventionally used in lacquers.

The hydrophobic component a) of the above-defined embodiment of component A) of the coating compounds according to the invention is obtained by copolymerisation of esters of unsaturated carboxylic acids with an alcohol component which still contains at least one secondary hydroxyl group. The following are examples of unsaturated carboxylic acids of the unsaturated ester monomers: (Meth) acrylic acid (by (meth)acrylic is meant here and hereinafter methacrylic and/or acrylic), maleic acid and crotonic acid. The alcohol component of the ester monomers based on unsaturated carboxylic acids preferably contains from 3 to 25 carbon atoms. It may be based on short chain aliphatic alcohols, long chain aliphatic alcohols or condensation products of alcohols and glycidyl compounds with fatty acids.

The self-emulsifiable copolymers of the above-described embodiment of component A) will also be referred to hereinafter as acrylic copolymers for the sake of simplicity but it is only for preference that they are based on monomers on the basis of esters of (meth)acrylic acid; the simplified term includes esters of other unsaturated carboxylic acids, as defined above.

The following are examples of hydrophobic monomers having secondary OH functions:

Hydroxypropyl (meth)acrylate, adducts of glycidyl (meth)acrylate and saturated short chain fatty acids having $C_1$–$C_3$ alkyl groups, e.g. acetic acid or propionic acid, and adducts of Cardura E (glycidyl ester of versatic acid) with unsaturated COOH functional compounds such as acrylic or methacrylic acid, maleic acid or crotonic acid, adducts of Cardura E with unsaturated anhydrides such as maleic acid anhydride, reaction products of glycidyl (meth)acrylate with saturated branched or unbranched fatty acids having $C_4$–$C_{20}$-alkyl groups, e.g. butanoic acid, caproic acid, lauric acid, palmitic acid, stearic acid or arachidonic acid.

The hydrophilic component b) of this embodiment of component A) is prepared from monomers based on esters of unsaturated carboxylic acids such as (meth)acrylic acid, maleic acid and crotonic acid having at least one primary OH group in the alcohol moiety. The alcohol component of the unsaturated ester monomers may, for example, have 2 to 18 carbon atoms.

The following are examples of the monomers for producing the hydrophilic part of component A):

Hydroxyalkylesters of acrylic acid and/or methacrylic acid having a primary OH group and a $C_2$–$C_3$-hydroxyalkyl group such as hydroxyethyl(meth)acrylate and hydroxyalkylesters of acrylic acid and/or methacrylic acid having a primary OH group and a $C_7$–$C_{18}$-hydroxyalkyl group, e.g. butanediol monoacrylate, hydroxyhexyl acrylate, hydroxyoctyl acrylate and the corresponding methacrylates and reaction products of hydroxyethyl (meth)acrylate with caprolactone.

The hydrophilic parts of this embodiment of component A) also contain carboxyl groups, which are introduced by using carboxyl functionalised monomers in the preparation of component A), such as acrylic acid, methacrylic acid and crotonic acid. Other suitable carboxyl functionalised monomers include unsaturated anhydrides such as maleic acid anhydride and semiesters of maleic acid anhydride obtained by the chemical addition of saturated aliphatic alcohols such as ethanol, propanol, butanol and/or isobutanol.

Other comonomers which are free from OH groups may also be used for the preparation of this embodiment of component A).

Examples of these include long chain, branched or unbranched unsaturated monomers such as alkyl (meth) acrylates having $C_8$–$C_{18}$ chains in the alkyl moiety, e.g. ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, lauryl acrylate, 1214, isobornyl (meth) acrylate and 4-tertiary-butyl-cyclohexyl methacrylate. Further examples include short chain and medium chain branched or unbranched unsaturated monomers such as alkyl (meth)acrylates having $C_1$–$C_7$ chains in the alkyl moiety, e.g. methyl (meth)acrylate, ethyl (meth)acrylate, propyl acrylate, butyl (meth)acrylate, isobutyl (meth) acrylate, tertiary butyl (meth)acrylate, pentyl (meth) acrylate, hexyl (meth)acrylate and cyclohexyl (meth) acrylate. Aromatic vinyl compounds such as styrene and styrene derivatives such as vinyl toluene and p-methylstyrene may also be included as comonomers.

The copolymers of this embodiment of component A) are prepared by radical copolymerisation. The quantity of monomer used is calculated to fulfil the required specifications as regards molecular weight, OH group ratio, OH number and acid number.

The preparation is carried out, for example, as a radical solution polymerisation in the presence of a radical initiator, a process well known to the man of the art. The following are examples of radical initiators: Dialkyl peroxides such as di-tert.-butyl peroxide and dicumyl peroxide; diacyl peroxides such as dibenzoyl peroxide and dilauroyl peroxide; hydroperoxides such as cumene hydroperoxide and tert.-butyl hydroperoxide; peresters such as tert.-butyl perbenzoate, tert.-butyl perpivalate, tert.-butyl-per-3,4,5-trimethylhexanoate and tert.-butyl-per-2-ethylhexanoate; peroxydicarbonates such as di-2-ethylhexyl-peroxydicarbonate and dicyclohexyl peroxydicarbonate; perketals such as 1,1-bis-(tert.-butyl-peroxy)-3,5, 5-trimethylcyclohexane and 1,1-bis-(tert.-butylperoxy)

cyclohexane; ketone peroxides such as cyclohexanone peroxide and methyl isobutyl ketone peroxide and azo compounds such as 2,2'-azo-bis(2,4-dimethyl-valeronitrile), 2,2'-azo-bis(2-methylbutyronitrile), 1,1'-azo-bis-cyclohexane carbonitrile and azo-bis-isobutyronitrile.

The polymerisation initiators are generally added in a quantity, for example, of from 0.1 to 4% by weight, based on the weight of the monomers put into the process.

The radical polymerisation may be carried out as a one-shot process in which static distribution of hydrophobic and hydrophilic components is obtained.

It may, for example, be carried out by mixing together all the required monomers and the initiator(s) in a storage vessel and then adding the mixture over a period of, say, 5 hours with stirring to a solvent or solvent mixture which is at a temperature of e.g. 140° C. The copolymers thus obtained have a static distribution of the primary and secondary hydroxyl and carboxyl functions.

Alternatively, block polymerisation may be carried out to produce copolymers containing hydrophobic and hydrophilic blocks. These block copolymers may be prepared by a conventional procedure. For example, mixtures of hydrophobic monomers (optionally together with other comonomers) may first be polymerised, whereupon hydrophilic monomers (optionally together with comonomers) may be added and polymerisation may then be continued. In practice, a mixture of hydrophobic, hydroxyfunctional monomers, (meth)acrylic acid esters and optionally e.g. aromatic vinyl compounds may first be added and a further mixture of hydrophilic, hydroxyfunctional monomers, (meth)acrylic acid esters, aromatic vinyl compounds and COOH functional monomers may be added subsequently. The copolymers thus obtained have a hydrophobic and a hydrophilic chain end so that they may, for example, have the character of emulsifiers.

In another preferred variation of this embodiment of the invention, the acrylic copolymers of component A) may be prepared in the presence of the polyester oligomers of component B). This procedure enables the quantity of solvent which is put into the process and may subsequently have to be distilled off to be greatly reduced. It also enables the use of solvent to be completely avoided and the polyester oligomers may then be used as the only solvent for the preparation of component A).

In a further preferred embodiment of the invention, component A) thus consists of one or more polyester oligomer polyacrylates which are water-soluble after neutralisation with bases and are obtainable by radical polymerisation of from 80 to 50% by weight of c) at least one hydroxyfunctional (meth)acrylic acid ester and d) at least one monofunctional ethylenically unsaturated ester and e) optionally one or more $\alpha, \beta$-ethylenically unsaturated monomers which are free from hydroxyl groups and carboxyl groups in from 20 to 50% by weight of one or more hydroxy functional polyester oligomers obtainable by the polycondensation of diols, polyols and dicarboxylic acids and/or derivatives thereof having a calculated molecular weight of from 200 to 1000, preferably from 300 to 600, a hydroxyl number of from 280 to 600, preferably from 400 to 500, and an acid number of from 0 to 1.5, the monomers c), d) and e) being used in such quantities that the polyester oligomer polyacrylate obtained has a hydroxyl number of from 150 to 390 and an acid number of from 16 to 40, preferably from 20 to 30. Parts by weight and percentages by weight are based in each case on the solids content and add up to 100.

The last mentioned embodiment of binder component A) may be prepared, for example, as follows:

From 20 to 50 parts by weight (based on the solids content) of at least one hydroxyfunctional polyester oligomer obtainable from diols, polyols and dicarboxylic acids and having a calculated molecular weight of from 200 to 1000, preferably from 300 to 600, an OH number of from 280 to 600, preferably from 400 to 500, and an acid number of from 0 to 1.5 are introduced into a reaction vessel and in this oligomer are polymerised from 80 to 50 parts by weight (based on the solids contents of c), d) and e)) of c) at least one hydroxyfunctional (meth)acrylic acid ester and d) at least one monofunctional $\alpha,\beta$-ethylenically unsaturated carboxylic acid and optionally e) one or more $\alpha,\beta$-ethylenically unsaturated monomers which are free from functional groups in the presence of a radical initiator.

The calculated molecular weight M is determined according to T.C. Patton, Alkyd Resin Technology "Formulating Techniques and Allied Calculations", 1962, page 106 et seq, as follows:

$$M = \frac{w}{(M_o - e_a) + \frac{w_{(AN)}}{56100}}$$

wherein

M=average molecular weight

W=weight of all the components minus the water of condensation $M_0$=number of all the mols $e_a$=equivalents of acid $W_{(AN)}$=acid number of the polyester oligomer.

The polyester oligomer may be used as the only reaction medium without added solvent for the preparation of the polyester oligomer polyacrylate.

On the other hand, a water compatible or water soluble solvent for the polyester oligomer may be added for the preparation of the polyester oligomer polyacrylate.

The solvents used preferably have unlimited miscibility with water, e.g. monohydric aliphatic alcohols having 2 to 4 carbon atoms, such as ethanol or isopropanol, or ketones, e.g. acetone or methyl ethyl ketone, or glycol ethers such as methyl glycol, ethyl glycol, butoxyethanol, methoxypropanol, ethoxypropanol or methoxypropoxypropanol, or diols such as ethylene glycol or propylene glycol, or polyetherdiols such as polyethyl glycol or polypropylene glycol or any other solvents from other classes of compounds which have unlimited miscibility with water or mixtures of the above-mentioned compounds or classes of compounds. Solvents which have only limited miscibility with water or are completely immiscible with water may also be included, provided they are only used in proportions which do not give rise to cloudiness of the resin solutions or of the lacquers prepared from them. The solvents or mixtures thereof have, for example, the function of imparting to the resin solutions and to the water-thinnable lacquer compositions prepared from them the necessary and specified properties for their subsequent use.

The polyester oligomer used as reaction medium for the preparation of the polyester oligomer polyacrylate component may be prepared from polyols, dicarboxylic acids (and/or derivatives thereof) and diols. Polycondensation is carried out by the usual processes well known to the man of the art, for example solvent-free in the presence of conventional esterification catalysts and at elevated temperatures, e.g. of 180 to 230° C.

Examples of polyols include those having more than two OH groups, such as aliphatic triols and tetrols having 2 to 6 carbon atoms, e.g. trimethylolethane, trimethylolpropane, glycerol, 1,2,4-butanetriol, 1,2,6-hexanetriol and pentaerythritol.

Examples of dicarboxylic acids include aliphatic saturated and unsaturated dicarboxylic acids, e.g. maleic acid, fumaric acid, succinic acid, adipic acid, azelaic acid and sebacic acid; cycloaliphatic saturated and unsaturated dicarboxylic acids and aromatic dicarboxylic acids, e.g. phthalic acid, isophthalic acid, tetra-, hexa-, endo- methylene tetrahydrophthalic acid, endoethylene tetra-hydrophthalic acid and cyclohexane dicarboxylic acid (1.2, 1.3 and 1.4), itaconic acid, muconic acid and campheric acid, and optionally their possible anhydrides (as derivatives).

Examples of suitable diols include aliphatic diols, e.g. ethylene glycol, propylene glycol-(1,3) and -(1,2), butanediol, hexanediol-(1,6), and neopentyl glycol; polyether glycols of ethylene and propylene having up to 6 monomer units, such as diethylene glycol, triethylene glycol, tetraethylene glycol and hexaethylene glycol; and cycloaliphatic diols such as 1,3-dimethylolcyclohexane and 1,4-dimethylolcyclohexane.

One or more hydroxyfunctional (meth)acrylic esters, one or more monoethylenically unsaturated acids and/or derivatives thereof and optionally one or more α,β-ethylenically unsaturated monomers which are free from OH groups and from optionally neutralised COOH groups are subjected to radical polymerisation in the polyester oligomer or its solution, e.g. in a monohydric alcohol, in the presence of a radical initiator. Examples of radical initiators are the same as those mentioned above for the preparation of component A) based on esters of unsaturated carboxylic acids having hydrophobic and hydrophilic components.

Here again the polymerisation initiators are added, for example, in a quantity of from 0.1 to 4% by weight, based on the initial weight of the monomers.

The following are examples of α,β-ethylenically unsaturated monomers of components A)e) which are free from OH groups and from optionally neutralised COOH groups: (Meth)acrylic acid esters of alcohols having 1 to 12 carbon atoms in the chain, e.g. methyl, ethyl, n-propyl, isopropyl, butyl(n-, iso- and tert.-) alcohol, hexyl alcohol, 2-ethylhexyl alcohol and lauryl alcohol and aromatic vinyl compounds such as styrene, vinyl toluene and α-methylstyrene.

Examples of suitable hydroxyfunctional (meth)acrylic esters of component A)c) include (meth)acrylic esters of ethylene glycol, propylene glycol-(1,2) and -(1,3), butanediol-(1,4) and hexanediol-(1.,6) and polyethylene glycol mono(meth)acrylate having 6 to 8 ethylene glycol units and n-propylene glycol mono(meth)acrylate having 5 to 6 propylene glycol units. Hydroxyethylacrylate/ caprolactone adducts, butane-1,4-diol mono(meth)acrylate, polypropylene glycol mono(meth)acrylate and polyethylene glycol mono(meth)acrylate are preferred examples.

The hydroxyfunctional (meth)acrylic esters of component A)c) may be partly replaced by siloxane functional ethylenically unsaturated monomers, e.g. (meth)acrylic esters. Examples of these are 3-methacryloxypropyl trimethoxysilane and vinyl triethoxysilane.

Examples of α,β-ethylenically unsaturated carboxylic acids of component A)d) are: Acrylic acid, methacrylic acid, maleic acid and fumaric acid and their semiesters with aliphatic alcohols, and maleic acid anhydride.

The term "(meth)acrylic" used in the present description and the Patent Claims denotes acrylic and/or methacrylic.

The polyester oligomers optionally used as component B) in the coating compounds according to the invention may, for example, be the same and prepared in the same way as those described above for the preparation of the polyester oligomer polyacrylates.

The amine resins used as component C) in the coating compounds according to the invention may be conventional amine resin cross-linking agents as used in the field of lacquers.

It is generally preferred to use amine resin cross-linking agents which are water-soluble or can be rendered water-soluble by the addition of organic solvents. The solvents used for this purpose may be, for example, those described above for the preparation of the polyester oligomer polyacrylates or water compatible or water-soluble organic solvents used for the preparation of the lacquers.

Amine resins are well known to the man of the art, have been described in the literature and are available commercially. They may be prepared, for example, as described in Ullmanns Enzyklopädie der Technischen Chemie, Volume 3, pages 474 to 496, 1953 and in Houben-Weyl, Methoden der Organischen Chemie, Volume 14/2, pages 319–388, 1963, by the reaction of aldehydes, in particular formaldehyde, with compounds containing several amino or imino groups, e.g. melamine, urea, dicyandiamide or benzoguanamine or mixtures of such products. The amine resins are normally partly or completely etherified with aliphatic alcohols having 1 to 6, preferably 1 to 4 carbon atoms, methanol, ethanol and n- and iso-butanol being particularly preferred for the etherification. Highly imino functional melamine formaldehyde resins are particularly suitable, e.g. the Trade Products Cymel 323 and 325, partially methylated melamine formaldehyde resins such as the Trade Products Cymel 373 and 385 and highly methylolated melamine formaldehyde resins, e.g. the Trade Products Cymel 300 and 301 (Cymel is a Registered Trade Mark). Such preferred melamine formaldehyde resins preferably contain the following functional groups:

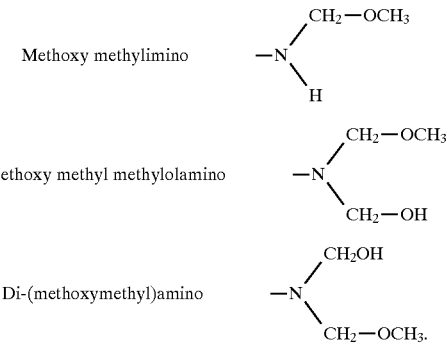

Such melamine resins etherified with methanol are mostly strongly hydrophilic and therefore water soluble.

Examples of water-insoluble amine resin cross-linking agents of component C) of the coating compounds according to the invention include water-insoluble melamines etherified with butanol or isobutanol, e.g. the Trade Products Setamin US 138 or Maprenal MF 610; mixed etherified melamines etherified both with butanol and with methanol, e.g. Cymel 254, and hexamethyloxy-methylmelamine (HMM melamine) such as Cymel 301 or Cymel 303 The latter may require an external acid catalyst such as p-toluene sulphonic acid for cross-linking.

By use of water soluble solvents it is possible to render water insoluble melamine resins compatible with water. Examples for such solvents are those exemplified for the preparation of the polyester-oligomer-acrylates. Melamine resins highly etherified with butanol are strongly hydrophobic; they can be rendered water compatible by the water soluble solvents; they are preferred in the binder emulsions. An example for them is Maprenal MF 3615.

The masked polyisocyanates used as second cross-linking component D) in the coating compounds according to the invention may be any conventional masked polyisocyanate cross-linking agents, e.g. diisocyanates, as used in the field of lacquers. These masked polyisocyanates preferably become unmasked at stoving temperatures above 80° C., e.g. above 120° C., to release the isocyanate groups.

The following are examples of such isocyanates: 2,4-Tolylenediisocyanate, 2,6-tolylenediisocyanate, 4,4-diphenylmethane diisocyanate, hexamethylene diisocyanate; 3,5,5-trimethyl-1-isocyanato-3-isocyanatomethylcyclohexane; m-xylylene diisocyanate, p-xylylene diisocyanate; tetramethylxylylene diisocyanate, tetramethyl diisocyanate, isophorone diisocyanate and cyclohexane-1,4-diisocyanate; the latter are preferred.

The diisocyanates may be linked together to form prepolymers having a relatively high molecular weight. These include, for example, adducts of tolylene diisocyanate and trimethylolpropane, a biuret formed from 3 molecules of hexamethyl diisocyanate, the trimers of hexamethylene diisocyanate and the trimers of isophorone diisocyanate.

The isocyanate groups are completely masked. Examples of masking agents are: Dimethyl malonate, diethyl malonate, ethyl acetoacetate, caprolactam, propanediol-(1, 2) and/or butanone oxime, the last mentioned masking agent being preferred; and other masking agents well known to the man of the art.

To prepare the coating compounds according to the invention, soluble copolymers or cocondensates of component A), e.g. the polyester oligomer polyacrylates given as examples, are subjected to neutralisation with bases. The bases used may in particular be the amines conventionally used in the lacquer field, preferably volatile low molecular weight organic amines or ammonia. Neutralisation of the polyester oligomer polyacrylate may be carried out with heating for obtaining a suitable working viscosity or it may be carried out after the addition of water compatible or water soluble organic solvents. The base is added in such a quantity that the pH of the neutralised product is about 7.0 to 10, preferably 7.5 to 9.

Neutralisation may be carried out in the presence of the amine resin cross-linking agent, the masked polyisocyanate and the other components of the coating compound but the amine cross-linking agent, masked polyisocyanate and additives may also be added to the polyester oligomer polyacrylate after neutralisation. Water is added to the neutralised product in such a quantity that a viscosity suitable for storage and transport is obtained; this addition of water is preferably carried out after addition of the amine resin cross-linking agent, the masked polyisocyanate, other additives and optionally solvents. The concentrate thus obtained may then be adjusted to the required viscosity for use by the addition of a further quantity of water, optionally together with other solvents, for example immediately before use. When ready for use, the coating compounds obtained have a solids content of, for example, up to 65%, based on the total weight of water, solvents, amine resin, masked polyisocyanate, polyester oligomer polyacrylate and other additives, such as pigments, fillers, etc. In clear lacquers which contain no pigments or fillers, this solids content may be, for example, up to 50% by weight.

This has the advantage that a very high solids content, based on the total solvent content, is obtained.

When emulsifiable copolymers or cocondensates are used, e.g. the above-described self-emulsifiable copolymers based on esters of unsaturated carboxylic acids containing hydrophobic and hydrophilic components, the usual processes well known to the man of the art may be used for preparing the aqueous emulsions. Thus components A), B) and C) may, for example, be mixed together, neutralised and emulsified. Alternatively, components A), B) and D) may first be mixed together, neutralised and subsequently mixed with cross-linking components C) and then emulsified in water.

In practice, for example, an acrylic copolymer containing solvent may be to a large extent freed from solvent, preferably by distillation at reduced pressure, and the solvent-free polyester oligomer may then be stirred into the acrylic copolymer while the latter is still hot, e.g. within a period of about 10 minutes. The resin is then partly or completely neutralised with bases. This may be carried out, for example, by slowly running in the bases, for example over a period of 5 minutes. One or more melamine resins may then also be introduced into the still hot resin/polyester oligomer mixture, for example over a period of 5 to 10 minutes.

Completely salt-free water is subsequently introduced into the hot resin mixture, e.g. within 60 to 90 minutes, for example with intensive mixing. Preparation of the dispersion may be assisted by heating the aqueous phase. The mixing apparatus used may be, for example, high speed stirrers or rotor/stator mixers. High pressure or ultrasound homogenisers may also be used to improve dispersion. The process may be carried out continuously or intermittently. An aqueous oil-in-water emulsion is obtained which is stable in storage and which can easily be adjusted to lower solids contents suitable for application by the addition of water. Additives such as pigments, fillers, etc. may be added during and/or after preparation of the emulsions, as required.

The aqueous emulsions obtained according to the invention may have HS values of, for example, from 80 to 90 and may have a solids content of, for example, up to 65% by weight, in particular from 25 to 55% by weight, based on the finished dispersion. For application, they may be diluted with water, e.g. to adjust them to a suitable viscosity for spraying.

The coating compounds according to the invention may contain the usual lacquer solvents in quantities of, for example, from 5 to 20% by weight, based on the coating compound ready for application. These solvents may be organic solvents such as aliphatic or aromatic solvents, including aliphatic and aromatic hydrocarbons, for example, toluene, xylenes, mixtures of aliphatic and/or aromatic hydrocarbons and esters, ethers and alcohols.

The coating compounds according to the invention have the advantage of only containing small quantities of organic solvents. These small quantities are preferably those used for the preparation of the polyester oligomer polyacrylate, which were introduced during preparation of the latter or added subsequently when formulating the coating compounds. Aliphatic monohydric alcohols having 2 to 4 carbon atoms are particularly preferred.

The solids content of the coating compounds according to the invention may be very high in spite of the low solvent content. For example, clear compositions free from pigments and fillers may be obtained with solids contents up to 50%. They are stable in storage and may advantageously be diluted with water to the required viscosity for application.

The low acid number of the binders used provides the added advantage that only a small quantity of neutralising agent (e.g. amine) is required, which in turn has the result that the cross-linking with amine resins, e.g. with melamine resin, is inhibited to a less extent due to the low proportion of amine left in the film.

The coating compounds according to the invention may be formulated as clear lacquers and as lacquers containing pigments and fillers. Conventional auxiliary agents and additives may be added to the formulation, for example levelling agents (e.g. silicone oils), deaerating agents, dispersing auxiliaries, light protective agents, anti-settling agents, plasticizers and stabilizers. Pigments and fillers may be added in addition to such conventional lacquer additives if the formulations are not required to give rise to clear lacquers. These pigments and fillers may be conventional inorganic or organic pigments and fillers used in lacquer technology, depending on the purpose for which the lacquers are to be used.

Examples of pigments include colour producing pigments such as titanium dioxide or carbon black and effect pigments such as metal scale pigments and/or pearly lustre pigments. The binder compositions prepared according to the invention, in particular those based on self-emulsifiable copolymers, are particularly suitable for coating compounds which contain such effect pigments. They preferably contain effect pigments together with colour producing pigments or colour producing pigments together with fillers. Talc and silicates are examples of such conventional lacquer fillers. The additives are used in the usual quantities well known to the man of the art.

The coating compounds according to the invention are suitable for coatings which adhere to numerous different substrates such as wood, textiles, plastics, glass, ceramics and in particular metal.

The coating compound according to the invention is applied by known methods such as spraying, immersion, roller application or application with coating knife.

The coating compound may be applied to a substrate already covered with other lacquer coats. After a phase of evaporation, the applied coating compound is cross-linked by heating. The stoving temperatures may be e.g. from 100° to 180° C.; for coating compounds based on self-emulsifying copolymers the temperatures are preferably from 110° to 150° C., and for coating compounds based on polyester oligomer polyacrylates they are preferably from 130° to 160° C. The thickness of the stoved film is about 15 to 50 $\mu$m. A cross-linked, hard, glossy and acid resistant lacquer coat is obtained.

It has surprisingly been found that optically perfect surfaces are obtained even with very thin coats, for example of 20 $\mu$m.

It may in some cases be advantageous to control the stoving process catalytically. Conventional curing catalysts may be added for this purpose. These may be commercial products such as blocked or free sulphonic acids and derivatives thereof. It is particularly advantageous to add such catalysts to the coating compound if a highly methylolated type of melamine resin such as the Trade Product Cymel 300 or Cymel 301 is used as cross-linking agent.

A preferred embodiment is the application of the coating compound according to the invention as a clear lacquer coat to an aqueous or non-aqueous basic lacquer, preferably an aqueous basic lacquer. The application may be carried out wet-in-wet or the basic lacquer may first be dried by heating. Particularly firm adherence of the two layers is then obtained.

The pigment-free coating compounds according to the invention formulated as clear lacquers may be used, for example, for coating basic lacquers which contain the usual covering lacquer pigments; they preferably contain effect pigments, e.g. metallic pigments. The binders used for the basic lacquer are preferably polyester or poly-urethane or acrylate resins. These binders are optionally cross-linked by means of cross-linking agents, e.g. melamine derivatives or isocyanate derivatives.

Below are given some examples of further basic lacquers which may advantageously be coated with pigment-free clear lacquers or pigment-containing covering lacquers prepared according to the invention.

Water based lacquers based on 50 to 95% by weight of an aqeuous epoxide-functionalised emulsion polymer and 95 to 5% by weight of an anionic polyurethane dispersion having an acid number of from 5 to 10. Poly(meth)acrylate resins (used, for example, in a quantity of up to 20% by weight) are particularly suitable as grinding resins for pigments and additives used in such water-based lacquers. Examples of such water-based lacquers are described in DE-OS 3 623 124.

Basic lacquers based on polyesters having a glass transition temperature above 30° C., melamine resins (e.g. partially butylated melamine resins), polyurea plasticisers (for example based on an adduct of butyl urethane and formaldehyde) and a copolymer of polyethylene (85% by weight)/vinyl acetate (15% by weight) as wax dispersion. Such basic lacquers may contain conventional additives such as cellulose acetobutyrate (for example with differing molecular weight ranges). Examples of such basic lacquers are described in EP-A-187 397.

Examples of solvent based basic lacquers which are particularly suitable for repair purposes contain physically drying binders based on thermoplastic polyester and/or acrylic resin mixed with cellulose ethers or cellulose esters and/or polyvinyl acetates. They also contain self-hardening acrylic resin binders which contain colour pigments and have isocyanate reactive hydrogen atoms as well as mixtures of cellulose ethers and/or cellulose esters and/or cellulose semi-esters dissolved in solvents. Such lacquers are described e.g. in DE-OS 29 24 632.

All the above-mentioned basic lacquer formulations may contain conventional lacquer additives as well as conventional fillers and colour producing pigments and metallic pigments such as aluminium bronzes or special steel bronzes and other effect pigments.

Powder lacquers as described, for example, in "Products Finishing", April 1976, pages 54 to 56, are examples of basic lacquers which may be coated with clear lacquers based on the coating compounds according to the invention.

The binders contained in the coating compounds according to the invention have a high pigment wetting capacity so that the coating compounds according to the invention may be used as coloured single coat covering lacquers which give rise to high gloss coats with excellent gloss retention and technologically good mechanical properties.

The coating compounds according to the invention may also be formulated as basic lacquers and as fillers. In such cases they are particularly suitable for the production of multi-coat lacquerings, e.g. for motor vehicles. The usual additives, e.g. those described above for basic lacquers, may be added to the formulations of such basic lacquers or fillers.

Compared with conventional basic lacquers, the basic lacquers according to the invention give rise to coatings with improved resistance to moist heat, due to the exceptionally good cross-linking effect.

The basic lacquers according to the invention may be covered wet-in-wet with conventional clear lacquers, optionally after a brief initial drying period. They are preferably covered with clear lacquers based on the coating compounds according to the invention.

The coating compounds according to the invention are particularly suitable for use as covering lacquers or clear lacquers and basic lacquers which are preferably used in the motor vehicle industry but may also be used in other fields. The use of the coating compound according to the invention in multi-coat lacquering is particularly suitable for the series lacquering of motor vehicles but may also be used for other purposes, e.g. for coating domestic appliances or in the furniture industry for producing exceptionally acid resistant coatings.

The aqueous coating compounds according to the invention are particularly distinguished from conventional systems containing organic solvents by their low solvent content combined with high solids content and low viscosity. They are thus particularly environmentally friendly.

Lacquer films produced from the coating compounds according to the invention are surprisingly found to have as high a level of properties as the known solvent-containing systems. Properties such as surface hardness, clarity, gloss, fullness, levelling, scratch resistance, elasticity, resistance to solvents, preservatives and other agents used for maintenance and to certain chemicals, e.g. brake fluid, diesel fuel and carburettor fuel and especially acids, e.g. sulphuric acid, and short term and long term resistance to weathering are equal to those of the known solvent-containing systems and in some cases better.

Summarizing, the invention provides coating compounds which are exceptionally environmentally friendly due to their low solvent content and low requirement for neutralising agents. Due to the low proportion of neutralising agents such as amines contained in them, cross-linking by melamine resins is only slightly inhibited, with the result that the coatings obtained have good mechanical and chemical resistance. The coatings have good weather resistance (they conform to the most recent requirements determined by the KFA test, which is the edge filter test A described in VDA Test Sheet 621-4,3 Point 2, July 1983).

The coating compounds have good storage stability as lacquers. The proportion of organic solvents in the binders is low so that there is a wider scope for solvent combinations in the formulation of the lacquers.

Moreover, mild solvents such as alcohols may be used, e.g. ethanol. The solvent (including water) therefore easily evaporates so that rapid initial drying is achieved and dripping of the coat is avoided. Environmentally compatible systems are provided by the low solvent content combined with high solids content and the use of water.

In the following Examples, parts (P) and percentages apply to weight.

EXAMPLE 1

Preparation of an acrylic block copolymer

540 P xylene
60 P butanol
435 P glycidyl ester of versatic acid (Trade Product Cardura E-10 of Shell)

are introduced into a 4 litre three-necked flask equipped with reflux condenser, feed funnel and stirrer and heated to boiling (138°–141° C.).

126 P Acrylic acid
120 P lauryl acrylate-1214
120 P styrene
252 P hydroxypropyl methacrylate
348 P isobutyl acrylate and
48 P tert.-butyl perbenzoate are continuously introduced within 3 hours and 78 P acrylic acid
330 P isobutyl acrylate
243 P butanediol monoacrylate
252 P isobutyl methacrylate and
48 P tert.-butyl perbenzoate are then continuously added within 2 hours.

The reaction mixture is then after-polymerised under reflux for 4 hours. The resin obtained has a solids content of 80% and an acid number of 26 mg KOH/g.

EXAMPLE 2

Preparation of an acrylate emulsion from the acrylic block copolymer of Example 1

515 P of the acrylic block copolymer described in Example 1 are introduced into a 2-litre three-necked flask equipped with distillation bridge, feed funnel, thermometer and stirrer and heated to 135° C. A vacuum is applied and solvent is distilled off (103 P). The reaction mixture is then cooled to 85° C. and adjusted to normal pressure with inert gas. 16.8 P of dimethylethanolamine are added with stirring and mixed in for 5 minutes. 22.4 P of polyester oligomer (Example 5), 32.0 P of masked poly-isocyanate (butanoxime-masked isophorone diisocyanate isocyanurate, Trade Product T 1890, 70% in butyl glycol, of Hüls AG), 204.8 P of hydrophobic melamine resin (Trade Product Setamin$^R$ US-138, 70% in butanol, of AKZO) and 25.6 P of hydrophilic melamine resin (Trade Product Cymel$^R$ 327, 90% in isobutanol, of Cyanamide company) are then added with stirring in the sequence given. When mixing has been carried out for about 5 minutes at 65°–60° C., 936.0 P of completely desalted water are continuously added within 90 minutes while the temperature is maintained at 60° C. The aqueous acrylate block copolymer emulsion obtained has a solids content of 37.4% and an HS-value of 86.4%.

EXAMPLE 3

Preparation of an acrylic copolymer

160 P xylene
40 P butanol and
289 P glycidyl ester of versatic acid (Trade Product Cardura $^R$ E 10 of Shell)

are introduced into a 2-litre three-necked flask equipped with reflux condenser, feed funnel and stirrer and heated to boiling (138°–141° C.).

40 P Lauryl acrylate
40 P styrene
80 P isobutyl acrylate
81 P butanediol monoacrylate
109 P acrylic acid
129 P isobutyl methacrylate and
32 P tert.-butyl perbenzoate are then continuously added within 5 hours. When these components have been added, after-polymerisation is carried out for 4 hours under reflux. The acrylic copolymer obtained has a solids content of 80% and an acid number of 27.1 mg KOH/g.

EXAMPLE 4
Preparation of an emulsion from the acrylic copolymer of Example 3

421 P of the acrylic copolymer of Example 3 are introduced into a 2-litre three-necked flask equipped with distillation bridge, feed funnel, thermometer and stirrer and heated to 135° C. A vacuum is applied and solvent is distilled off (84 P). The reaction mixture is then cooled to 85° C. and adjusted to normal pressure with inert gas. 14.1 P of dimethylethanolamine are added with stirring and mixed in for 5 minutes. 42.0 P of polyester oligomer (Example 5), 176.6 P of masked polyisocyanate (as in Example 2) and 127.0 P of melamine resin (as in Example 2) (Trade Product Maprenal UMF 3615) in the form of an 80% solution in butanol are then added with stirring in the sequence given. When mixing has been carried out for about 5 minutes at 65°–60° C., 710.0 P of completely desalted water are continuously added within 90 minutes while the temperature is maintained at 60° C. The aqueous acrylate resin emulsion obtained has a solids content of 42.9% and an HS value of 86.7%.

EXAMPLE 5
Preparation of a polyester oligomer 336.7 g of trimethylolpropane, 366.8 P of adipic acid and 297 g of hexanediol are esterified solvent-free to an acid number of 20 with 5 g of hypophosphorous acid at 180° to 230° C. in a 2-litre three-necked flask equipped with stirrer, separator, thermometer and reflux condenser.

The reaction mixture is then condensed under vacuum to an acid number below 1.5.

The product thus obtained has a stoving residue of 94.5% (1 h, 150° C.), a viscosity of 3200 mPa.s (100%), a hydroxyl number of 460 and a Hazen colour number of 30.

Conventional additives suitable for aqueous systems, such as light-protective agents [0.7 P of solution of a sterically hindered amine (Trade Product Tinuvin 292) and 1.0 P of a benzotriazole derivative (Trade Product Tinuvin 1139)] and additives such as petroleum hydrocarbons, esters and alcohols which influence the levelling and boiling properties are added to the acrylate emulsion concentrates obtained in Examples 2 and 4 before these are diluted with completely desalted water to adjust them to a suitable viscosity for spraying.

Dry films 30 to 45 μm in thickness could be applied to commercial basic lacquers by the usual wet-in-wet process in 2 to 3 spray coats, using an operating viscosity of 30" $AK_4$, 20° C.

After their application, the films obtained were ventilated (evaporated) for 6 minutes, pregelled at 80° C. for 10 minutes and finally stoved at 140° C. for 20 minutes. At the end of this treatment they had excellent hardness and a very high gloss and passed the usual industrial oil/carbon black test (Opel Specification GME 60 403) without any alteration to the surface.

EXAMPLE 6
Preparation of a polyester oligomer 336.7 g of trimethylolpropane, 366.8 g of adipic acid and 197 g of hexanediol are esterified solvent-free to an acid number of 20 with 5 g of hypophosphorous acid at 180° to 230° C. in a 2-litre three-necked flask equipped with stirrer, separator, thermometer and reflux condenser.

The reaction mixture is then condensed under vacuum to an acid number below 1.5.

The product thus obtained has a stoving residue of 94.5% (1 h, 150° C.), a viscosity of 3200 mPa.s (100%), a hydroxyl number of 460 and a Hazen colour number of 30.

EXAMPLE 7
Preparation of polyester oligomer polyacrylates 717 g of polyester oligomer from Example 6 and 597 g of ethanol are heated to reflux at 81° C in a 4-litre three-necked flask equipped with stirrer, reflux condenser, dropping funnel and thermometer.

A mixture of 552 g of butanediol monoacrylate, 996 g of tert.-butylacrylate, 74 g of acrylic acid and 50 g of Vazo 67 (2,2-azo-bis-2-methyl-butyronitrile) is added dropwise within 4 hours and the mixture is then after-polymerised for 4 hours.

The product had a stoving residue of 79.8% (1 h, 150° C.) at a viscosity of 7200 mPa.s (DIN 53015), an acid number of 26.3, an OH number of 231 and a Hazen colour number of 60.

EXAMPLE 8
Preparation of a water dilutable clear lacquer 309.8 g of the polyester oligomer polyacrylate described in Example 7, 24.3 g of a highly imino functional melamine resin, 112.4 g of the trimer of isophorone diisocyanate masked with butanone oxime and 26.3 g of ethanol were thoroughly premixed in a laboratory stirrer and a mixture of 119.8 g of butoxyethanol, 10.6 g of a UV absorbent of the benzotriazole series, 7.1 g of a radical acceptor of the HALS type and 3.1 g of a commercial silicone based levelling product were added with further stirring. The reaction mixture was then neutralised with 13.9 g of dimethylethanolamine with stirring which was continued for a further 15 minutes and the mixture was then diluted with a mixture of 297.7 g of completely desalted water and 25 g of ethanol. The lacquer had a viscosity of 27 seconds (determined in a DIN-4 cup at 20° C.) and a pH of 8.4. The lacquer was drawn over a glass plate with a wire coater, predried at 80° C. for 15 minutes and then stoved at 140° C. for 20 minutes. The resulting lacquer film was clear and highly glossy and had a layer thickness of 40 μm and a König pendulum hardness of 137 seconds. A lacquer film prepared by a similar method on a blank sheet iron (Erichsen sheet) had an Erichsen cupping of 6.3 mm and high resistance to sulphuric acid.

EXAMPLE 9

Suitable additives, such as light protection agents (0.7 parts of a sterically hindered amine solution (trade product Tinuvin 292) and 1.0 parts of a benzotriazole derivative (trade product Tinuvin 1130) and additives, benzines, esters, alcohols, which have a levelling and pitting influence, are added to the acrylate emulsion concentrates obtained in examples 2 and 4, before dilution with demineralized water to a spraying viscosity.

In the usual wet-in-wet process, dry films of 30–45 μm could be applied in 2 to 3 spraying operations on commercially available base coats at a processing viscosity of 30" AK , 20° C.

The thus obtained films were air-dried (evaporated) for 6 minutes after application, pre-gelled for 10 minutes at 80° C. and finally baked for 20 minutes at 140° C. After this, the films had an excellent hardness, a very high shine and complied with the usual industrial oil/soot tests (Opel specification GME 60 403) without any changes occurring to the surface.

We claim:

1. Aqueous, heat-curable coating compound consisting essentially of
   A) from 38.5 to 80% by weight of one or more film-forming copolymers and/or cocondensates which are emulsifiable in water or rendered water soluble by neutralisation with bases, having a number average molecular weight (Mn) of from 800 to 10,000, a hydroxyl number of from 60 to 390 and an acid number of from 15 to 60, B) from 3.5 to 25.5% by weight of one or more polyester oligomers having a calculated molecular weight of from 200 to 1000, a hydroxyl number of from 280 to 600 and an acid number of from 0 to 1.5, C) from 3.5 to 40% by weight of one or more amine resin cross-linking agents and D) from 0.5 to 28% by weight of one or more masked polyisocyanates, the percentages by weight of components A) to D) being based in each case on the solids contents by weight of the resins and adding up to 100% by weight, and water.

2. Coating compound according to claim 1, in which the amine resin cross-linking agents of component C) consist of one or more amine resin cross-linking agents which are soluble in water and/or rendered soluble in water by the addition of organic solvents.

3. Coating compound according to claim 1, wherein the amine resin cross-linking agents of component C) consist of one or more water-insoluble amine cross-linking agents containing up to 4% by weight, based on the sum of components A), B), C) and D), of one or more water-soluble amine cross-linking agents.

4. Coating compound according to claim 1, in which the copolymers of component A) consist of one or more self-emulsifiable copolymers which are esters of unsaturated carboxylic acids having hydrophobic and hydrophilic components, partly or completely neutralised with bases, a) the hydrophobic components being based on monomeric esters of unsaturated carboxylic acids containing secondary OH groups which may be present together with comonomers which are free from OH groups, and b) the hydrophilic components being based on monomeric esters of unsaturated carboxylic acids containing primary OH groups and monomeric esters of unsaturated carboxylic acids containing COOH groups, which may be present as a mixture with comonomers which are free from OH groups, the numerical ratio of primary to secondary OH groups in the copolymer being from 1:1.5 to 1:2.5 and the copolymer having an acid number of from 15 to 60, an OH number of from 60 to 200 and a number average molar mass (Mn) of from 2000 to 10,000.

5. Coating compound according to claim 1, wherein the copolymer or copolymers of component A) consist(s) of one or more polyester oligomer/polyacrylates having a number average molecular weight (Mn) of from 800 to 2000 which are water-soluble after neutralisation with bases and are obtainable by radical polymerisation of from 80 to 50% by weight of c) at least one hydroxyfunctional (meth)acrylic acid ester and d) at least one monofunctional α,β-ethylenically unsaturated carboxylic acid and e) optionally one or more α,β-ethylenically unsaturated monomers free from hydroxyl groups and free from carboxyl groups, in 20 to 50% by weight of at least one hydroxy-functional polyester oligomer obtainable by the polycondensation of diols, polyols and dicarboxylic acids and/or derivatives thereof and having a calculated molecular weight of from 200 to 1000, a hydroxyl number of from 280 to 600 and an acid number of from 0 to 1.5, the mononmers c), d) and e) being used in such quantities that the polyester oligomer/polyacrylate obtained has a hydroxyl number of from 150 to 390 and an acid number of from 16 to 40.

6. Coating compound according to claim 4 in the form of an emulsifier-free aqueous emulsion containing A) 38.5% to 80% by weight of one or more self-emulsifiable copolymers according to claim 4, B) from 3.5 to 25.5% by weight of one or more polyester oligomers having a calculated molecular weight of from 200 to 1000, a hydroxyl number of from 280 to 600 and an acid number of from 0 to 1.5, C1) from 3.5 to 28% by weight of one or more water insoluble amine resin cross-linking agents, C2) from 0 to 4% by weight of one or more water-soluble amine resin cross-linking agents and D) from 0.5 to 28% by weight of one or more masked polyisocyanates, the percentages by weight of components A) to D), being derived from the solids contents of the resins by weight and adding up to 100% by weight, and water.

7. Coating compound according to claim 5, containing

A) from 80 to 55% by weight of one or more polyester oligomer polyacrylates which are water-soluble after neutralisation with bases as claimed in claim 5, C) from 15 to 40% by weight of one or more amine cross-linking agents which are soluble in water and/or rendered soluble in water by the addition of organic solvents, and D) from 5 to 20% by weight of one or more masked polyisocyanates.

8. Aqueous coating compound according to claim 5, wherein the polyester oligomer polyacrylate is obtainable by radical polymerisation of the monomers c), d) and e) in a solution of the polyester oligomer in a solvent which is compatible with water or soluble in water.

9. Aqueous coating compound according to claim 8, wherein the water-soluble solvent is an aliphatic monohydric alcohol having 2 to 4 carbon atoms.

10. Aqueous coating compound according to claim 5, wherein the hydroxyfunctional (meth)acrylic acid ester of component A)a) is polypropylene glycol monomethacrylate or 4-hydroxybutyl acrylate.

11. Coating compound according to claim 1 wherein the masked polyisocyanates consist partly or completely of polyisocyanates containing cycloaliphatic groups in the molecule.

12. Coating compound according to claim 1 wherein the masked polyisocyanates are masked with masking agents which are removed at from 80° to 160° C.

13. Aqueous coating compound according to claim 1, characterised in that it is in the form of a clear lacquer without pigments or fillers.

14. A process for the preparation of the coating compounds according to claim 4, characterised in that from 38.5 to 80% by weight of one or more self-emulsifiable copolymers as defined in claim 4 are mixed with from 3.5 to 25.5% by weight of one or more polyester oligomers as defined in claim 1 and with from 0.5 to 28% by weight of masked polyisocyanate as defined in claim 1, whereupon the copolymer is neutralised by the addition of bases and from 3.5 to 28% by weight of water insoluble amine resin cross-linking agent and from 0 to 4% by weight of water soluble amine resin cross-linking agent are mixed in with the resulting neutralised mixture, whereupon the resulting mixture is emulsified in water.

15. A process for the preparation of an aqueous, heat curable coating compound according to claim 5, characterised in that from 20 to 50% by weight of one or more hydroxy functional polyester oligomers obtainable by the polycondensation of diols, polyols and dicarboxylic acids and/or derivatives thereof and having a calculated molecular weight of from 200 to 1000, a hydroxyl number of from 280 to 600 and an acid number of from 0 to 1.5 are introduced into a reaction vessel and from 80 to 50% by weight of c) at least one hydroxy functional (meth)acrylic acid ester and d) at least one monofunctional $\alpha,\beta$-ethylenically unsaturated carboxylic acid and e) optionally one or more $\alpha,\beta$-ethylenically unsaturated monomers free from hydroxyl groups and carboxyl groups are polymerised in this polyester oligomer in the presence of a radical initiator, the monomers c), d) and e) being used in such quantities that the polyester oligomer polyacrylate obtained has a hydroxyl number of from 150 to 390 and an acid number of from 16 to 40, whereupon from 80 to 55 parts by weight of the resulting polyester oligomer polyacrylate are mixed with 15 to 40 parts by weight of one or more amine resin cross-linking agents which are soluble in water and/or rendered water-soluble by means of organic solvents and from 5 to 20 parts by weight of one or more masked polyisocyanates, neutralising agents and water, and optionally with one or more organic solvents, pigments, fillers and/or auxiliary agents and additives conventionally used in organic lacquers.

16. The heat-curable coating compound of claim 1 which further contains one or more organic solvents, pigments, fillers and/or auxiliary agents and additives used in lacquers.

17. The coating compound of claim 6 which further contains one or more organic solvents, pigments, fillers and/or auxiliary agents and additives used in lacquers.

* * * * *